Dec. 6, 1966  O. KENT  3,289,563
EXTENSIBLE CAMERA AND FLASH GUN SUPPORT
Filed Aug. 12, 1964  2 Sheets-Sheet 1
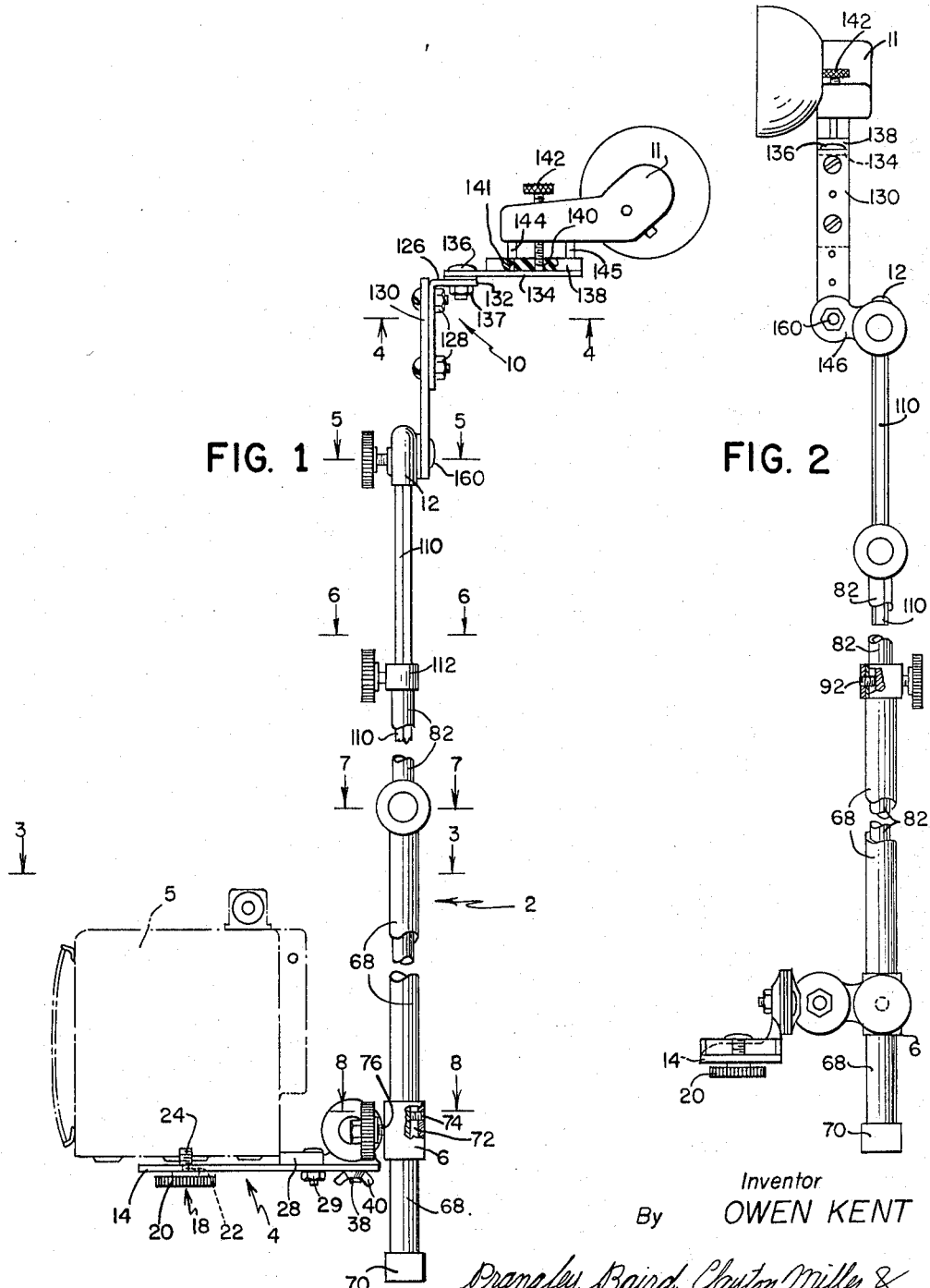
Inventor
OWEN KENT
By
Prangley, Baird, Clayton Miller & Vogel.  Attys.

Dec. 6, 1966 O. KENT 3,289,563
EXTENSIBLE CAMERA AND FLASH GUN SUPPORT
Filed Aug. 12, 1964 2 Sheets-Sheet 2
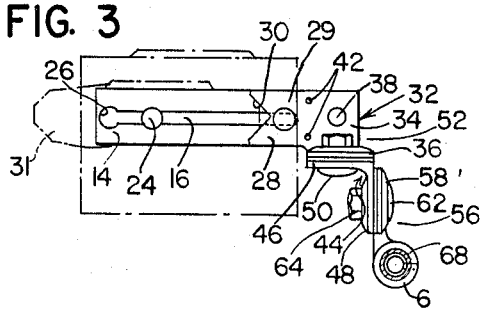
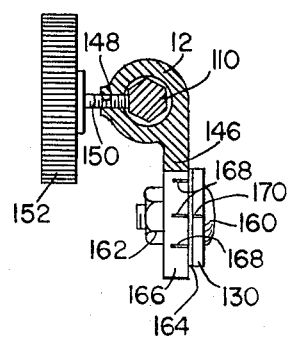
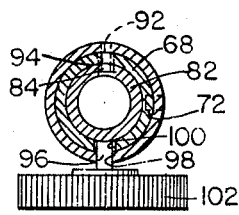
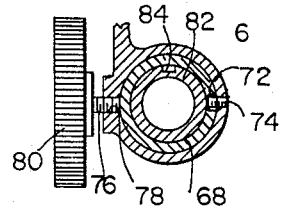
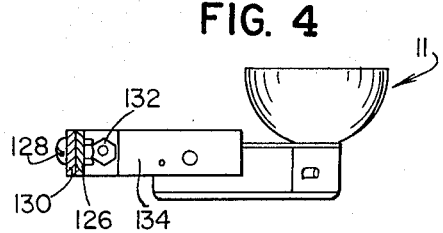
Inventor
OWEN KENT
By
Prangley, Baird, Clayton, Miller & Vogel
Attys.

United States Patent Office 3,289,563
Patented Dec. 6, 1966

3,289,563
EXTENSIBLE CAMERA AND FLASH GUN SUPPORT
Owen Kent, Chicago, Ill., assignor to Reliance Camera & Photo Supplies Inc., Chicago, Ill., a corporation of Illinois
Filed Aug. 12, 1964, Ser. No. 389,000
7 Claims. (Cl. 95—86)

This invention relates to a camera and flash gun support and more particularly to means supporting a camera and flash gun for angular adjustment relative to each other about a plurality of perpendicular and parallel axes and for extension and retraction to vary the spacing between the camera and the flash gun within wide limits.

In the taking of photographs by means of a flash gun attached to a camera, the lighting of the subject is far from even or uniform; "washouts" frequently occur and uncontrollable "shadows" mar the quality of the photograph.

It is an object of this invention to provide angularly adjustable, extensible and retractable means for supporting a camera and a flash gun to permit a wide choice in the positioning of the flash gun relative to the camera and the subject so as to obtain more effective lighting of the subject; to eliminate "washouts" and undesired shadows and to obtain desired shadow effects.

Other and further objects of the invention are to provide angularly adjustable, extensible and retractable means for supporting any of a wide variety of cameras and any of a wide variety of flash guns or strobes; to provide in a flash gun and camera supporting means, angularly adjustable friction-swivel connections and a boom having means for preventing relative rotation of the telescoping members during their extension and retraction so that the spacing between the camera and the flash gun may be widely varied or adjusted without changing the angular relationship between the camera and the flash gun.

Other and further objects and advantages of the invention will be apparent from the following description when taken in connection with the accompanying drawings in which:

FIGURE 1 is a view in elevation of an angularly adjustable, extensible and retractable camera and flash gun support embodying the invention, certain parts being broken away for illustrative purposes and because of space limitations;

FIGURE 2 is a view in elevation of the device shown in FIGURE 1 and taken at right angles to FIGURE 1;

FIGURE 3 is a view in horizontal section taken along the lines 3—3 of FIGURE 1;

FIGURE 4 is a view in horizontal section taken along the line 4—4 of FIGURE 1;

FIGURE 5 is a view in horizontal section taken along the line 5—5 of FIGURE 1;

FIGURE 6 is a view in horizontal section taken along the line 6—6 of FIGURE 1;

FIGURE 7 is a view in horizontal section taken along the line 7—7 of FIGURE 1;

FIGURE 8 is a view in horizontal section taken along the line 8—8 of FIGURE 1; and FIGURE 9 is a fragmentary view in perspective illustrating the connections between the telescopic members forming parts of the device of FIGURE 1.

As shown in FIGURE 1 of the drawings, an angularly adjustable, extensible and retractable support embodying the invention comprises a boom 2, a supporting bracket or member 4 for detachably supporting a press type camera 5 mounted on a boom receiving sleeve or bracket 6 by a swivel mount 8 and supporting means 10 for detachably supporting a flash gun or strobe 11 and mounted for angular adjustment on a sleeve or bracket 12 releasably secured to the upper end of the boom 2.

The camera supporting means or member 4 may comprise a plate or bar 14, FIGURES 1 and 3, having a slot 16 receiving a camera mounting screw which preferably comprises a stud 18, FIGURES 1 and 2, having a knurled operating head 20, adjacent an unthreaded shank portion 22, FIGURE 1, slightly smaller in diameter than the width of the slot 16, and a threaded portion 24, FIGURES 1 and 3, slightly larger in diameter than the width of the slot 16. The slot 16 is preferably provided at its outer end with an enlarged portion 26 permitting the threaded portion 24 of the camera attaching screw to be passed through the slot until the unthreaded shank portion 22 of the screw is in registry with the slot and therefore readily movable lengthwise of the slot. It may be noted that the enlarged portion 26 of the slot is preferably of a diameter such as to provide a close fit with the threaded portion 24 of the camera attaching screw to prevent gravity disengagement of the screw even when the screw is positioned at the outer end of the slot. The bar 14 and the slot 16 therein are of sufficient length to accommodate such a wide range of camera sizes so as to be of substantially universal adaptation.

It may be noted that the threaded portion 24 of the camera attaching screw 18 is of a size to fit the internally threaded tripod mounting bracket (not shown) with which every camera is equipped.

The supporting means or member 4 also comprises a stop block 28, FIGURES 1 to 3, secured as by a bolt and nut 29 to the plate 14 adjacent the inner end of the slot 16 for adjustment longitudinally of the slot. When the camera 5 is positioned in abutting engagement with the outer edge of the stop block 28 and the camera attaching screw 18 tightened, the camera is held, by the stop block, against inadvertent swinging relative to the supporting plate 14.

The block 28 may be provided with a V-slot 30, FIGURE 3, inwardly from its outer edge to accommodate the bevelled end of the popular small cameras, as illustrated at 31 in FIGURE 3, so as more effectively to prevent swinging of those cameras relative to the supporting plate 14.

The swivel mount 8 preferably comprises a first bracket 32 having right angular plate-like portions 34 and 36, the bracket 32 being detachably secured to the plate 14, as by a bolt 38 and a wing nut 40, FIGURE 1, and a pair of positioning pins 42, FIGURE 3, carried by the plate-like portion 38 and received in registering openings in the plate 14. The pins 42 serve to prevent relative swinging of the bracket 32 relative to the plate 14 and to position the bracket in abutting engagement with the stop block 28.

The swivel mount 8 also includes a second, right angle bracket 44 having plate-like portions 46 and 48. The plate-like portion 46 of the bracket 44 is pivotally connected to the plate-like portion 36 of the bracket 32 by a bolt or threaded stud 50 and a lock nut 52. The brackets 32 and 44 are preferably made of die cast aluminum and a friction washer 54, preferably lubricated, is inserted between the plate-like portion 46 of the bracket 44 and the plate-like portion 36 of the bracket 32. This permits angular adjustment of the bracket 44 about the optic axis of the camera and its friction retention in any angularly adjusted position.

The swivel mount 8 also includes a third bracket 56 having a plate-like portion 58 integral with the sleeve or bushing 6 for slidably receiving the boom 2. The plate-like portion 58 of the bracket 56 is secured to the plate-like portion 48 of the bracket 44 by a stud 62 and a lock nut 64. The bracket 56 is also preferably made of die cast aluminum and a friction washer 66, preferably lubricated, is interposed between the plate-like portions 48 and 58 to permit relative angular adjustment of the brackets 44 and 56 about an axis perpendicular to the optic axis of the camera while frictionally retaining the brackets in any adjusted position.

The boom 2 comprises a first hollow tube 68, FIGURES 1 to 3 and 7 to 9, slidably received in the sleeve or bushing 6 and having at its lower end a stop collar 70, FIGURES 1 and 2, press fitted or otherwise secured to the tube and preventing withdrawal of the tube from the sleeve 6.

The tube 68 is provided with a longitudinally extending slot or keyway 72 extending from end to end thereof. A pin or key 74 is pressed fitted in a hole in the sleeve 6 and extends from the barrel of the sleeve into engagement with the slot 72 to prevent rotation of the tube 68 relative to the sleeve 6 as it is longitudinally adjusted through the sleeve.

A clamping screw 76 is received in an internally threaded hole 78 in the sleeve 6 and is provided with an enlarged, knurled head 80 by which the screw is brought into a clamping engagement with the tube 68 to clamp the tube in any adjusted position relative to the sleeve 6.

The boom 2 also comprises a second tube 82 slidably fitting within the tube 68 and provided with a longitudinal slot or keyway 84 extending from end to end thereof. A coupling sleeve 86 is provided with an enlarged opening 88, FIGURE 9, to receive the upper end of the tube 68 and a smaller opening 90 communicating with the opening 88 and extending to the other end of the sleeve 86 to slidably receive the tube 82.

A pin or key, FIGURES 2, 7 and 9, is press fitted into the sleeve 86 and extends through an opening 94 in the tube 68 into engagement with the slot 84, the pin serving to hold both the sleeve 86 and the tube 84 against rotation relative to the tube 68 as the tube 82 is telescopically extended from and retracted into the tube 68.

A clamping screw 96, FIGURE 7, is received in an internally threaded opening 98 in the sleeve 86 and passes through an opening 100 in the sleeve 68, the screw 96 being provided with an enlarged knurled head 102 for rotating the screw into releasable clamping engagement with the tube 82 thereby to clamp the tube 82 in any adjusted position relative to the tube 68.

The lower end of the tube 82 is provided with an annular groove 104, FIGURE 9, receiving a split ring or spring retainer 106 slightly larger in outer diameter than the outer diameter of the tube 82 so as to engage the annular shoulder 108 of the sleeve 86 and thereby act as a stop to limit the extension of the tube 82 relative to the tube 68.

The boom 2 also comprises a polygonal, preferably hexagonal, rod 110. The rod 110 is slidably guided for telescopic extension and retraction relative to the hollow tube 82 by a sleeve 112, FIGURES 1, 6 and 9, having a cylindrical opening 114 at its lower end to receive the upper end of the tube 82 and provided at its upper end with a polygonally shaped aperture 116 in communication with the opening 114 and extending to the upper end of the sleeve to form a guide for the rod 110 and to prevent rotation of the rod relative to the sleeve 112 and the tube 82.

A clamping screw 118 is received in a threaded opening 120 and passes through an enlarged opening 122 in the tube 82, the screw being provided with an enlarged knurled head 124 so that it may be rotated into releasable clamping engagement with the rod 110.

The supporting means or bracket 10 for detachably supporting the flash gun or strobe 11 comprises an L-shaped bracket 126, FIGURES 1 and 4, which may be detachably secured, as by nuts and bolts 128, to a bar 130. The bracket 126 may, if desired, be formed integrally with the plate 130. The transverse leg 132 of the bracket 126 supports a plate or bar 134, which may be secured thereto as by a pivot stud 136 and nut 137 for angular adjustment about an axis parallel to the longitudinal axis of the boom 2.

An insulating block 138 is riveted or otherwise secured to the bar 134 and is provided with a threaded opening 140 and an unthreaded opening 141 to receive the usual mounting screw 142 and the positioning pin 144 of the standard flash gun or strobe 11. The other positioning pin 145 of the standard flash gun or strobe may abut the upper surface of the block 138.

The sleeve 12, FIGURES 1, 2, 5 and 9, is open at its lower end to receive the rod 110 and closed at its upper end so as to position the sleeve at the upper end of the rod. The sleeve is preferably of die cast aluminum and is formed to provide a laterally extending, integral arm 146. The sleeve 12 is also provided with an internally threaded, laterally extending, opening 148 to receive a clamping screw 150, provided with a knurled head 152, to clamp the sleeve against rotation relative to the rod 110. The rod 110 is provided adjacent its upper end with an annular groove 154 which may receive the inner end of the screw 150, by slight lifting of the sleeve 12 relative to the rod 110, so that the sleeve can be adjusted angularly about the longitudinal axis of the rod without disengaging it from the rod.

The rod 110 is also provided, adjacent its upper and lower ends, with annular grooves 156 receiving split retainer rings 158 of slightly larger diameter than the "across the flats" dimension of the rod to form stops limiting the extension and retraction of the rod 110 relative to the sleeve 82, the lower retainer ring engaging the internal annular shoulder of the collar 112 and the upper retainer ring engaging the upper end surface of the same collar.

The bar or plate 130 is perferably mounted on the sleeve 12 for angular adjustment about an axis transverse to the axis of the boom 2, and perpendicular to the optic axis of the camera, as by a stud 160, FIGURE 5, passing through suitable apertures in the bar 130 and the arm 146 of the sleeve 12. A lock nut 162 serves with the stud 160 to clamp the sleeve and the bar in frictional engagement with a friction washer 164 inserted between the arm 146 and the bar 130, the washer being preferably lubricated since the sleeve 12 is formed of die cast aluminum. Thus the bar 130 may be angularly adjusted and frictionally retained in any adjusted position by the stud 160, lock nut 162 and the friction washer 164.

The arm 146 is preferably formed with a circular outer edge 166 provided with angularly spaced gauging notches or indicia 168, the lower end of the bar being preferably V-shaped to provide a narrow gauging edge 170 for cooperation with the indicia 168 so that the tilting of the flash gun or strobe can be gauged, recorded and repeated whenever desired.

For the purposes of describing the operation and capabilities of applicant's device, it may be assumed that the camera, as illustrated at 5 in FIGURE 1 or at 31 in FIGURE 3, has been secured to the support 4 and the flash gun or strobe 11 has been secured to the support 10.

If it is desired to photograph a subject by a side lighting effect, it is merely necessary by grasping the boom 2, to rotate the boom 2 relative to the camera about the axis of the stud 50 of the swivel mount 6, i.e. parallel to the optic axis of the camera, so as to extend the boom to one side or the other of the camera and then to extend the boom to the extent necessary to obtain the desired intensity and distribution of light upon the subject. This extension and retraction is readily effected by releasing one or more of the clamping screws 76, 96 or 118 and extending the tube 68 relative to the sleeve 6; the tube 82 relative to the tube 68, or the rod 110 relative to the tube 82. Retightening of the released clamping screw or screws holds the boom in the adjusted position.

If the angle at which the light is projected upon the subject does not give the desired evenness or distribution of light, the flash gun support 10 may be adjusted angularly, perpendicularly to the boom axis, about stud 160, and/or parallel to the boom axis about the stud 136 or by rotating the sleeve 12 on the rod 110, to obtain the desired lighting effect.

If it is desired to obtain a photograph by on level lighting, i.e., by the projection of light from a point approximating the same level as the camera, the boom tubes and rod may be fully retracted and the tube 68 fully lowered through the sleeve 6 until the collar 86 abuts the upper edge of the sleeve 6. The boom may then be rotated about the axis of the stud 62, either forwardly or backwardly relative to the camera, and/or the bar 130 may be rotated about the axis of the stud 160 to bring the flash gun or strobe 11 on level with the camera.

If it is desired to photograph a subject by overhead or below level lighting, it is merely necessary to rotate the boom about the axis of the stud 62 so as to extend above or below the camera supporting plate 14. The length of the boom and the angle of the bar 130 relative to the boom may be adjusted to obtain light intensity and vertical distribution. Any desired horizontal distribution of light may be obtained by releasing the clamping screw 150, slightly lifting the sleeve 12 on the rod 110 until the screw 150 engages the annular groove 154, rotating the sleeve about the boom axis and then re-clamping the screw 150.

It will be evident, of course, that once the proper desired angular relationship between the optic axis of the camera and the axis of projection of the light has been obtained, the spacing between the light source and the camera may be adjusted by extension or retraction of the boom parts without changing that angular relationship since those parts are held against rotation relative to each other.

In summary, it should be noted that applicant's camera and flash gun support permit complete flexibility in the spacing and angular adjustment of the axis of light projection relative to the optic axis of the camera. Thus, the flash gun may be adjusted in a first plane and about the axis of the stud 50 parallel to the optic axis; in a second plane perpendicular to the first plane and about the axis of the stud 62, or the stud 160, perpendicular to the optic axis, and in a third plane perpendicular to both the first and second plane and about, or parallel to, the boom axis by rotation of the sleeve 112 or the rotation of the bar 134 about the axis of stud 136. The great flexibility of adjustment of the flash gun or strobe relative to the camera and to the optic axis of the camera enables the flash gun or strobe to be used to make shadowless pictures or to obtain desired special shadow effects; to make "long shots," as of groups seated at banquet tables, with an even distribution of light from the front to the back of the subject and without overlighting of the front portion of the subject; to make close-ups with even lighting and to photograph a bride and groom cutting a wedding cake, without causing overlighting or "wash-out" of the cake.

A photographer frequently possesses several cameras and several types of flash guns or strobes. For photographing different types of subjects, scenes, or moving objects one of the cameras and one of the flash guns or strobes will be superior. Applicant's device is fashioned, as hereinbefore described, to a wide variety of types and sizes of cameras and a wide range of types and sizes of flash guns or strobes.

It will be apparent from the foregoing description that applicant has provided a combined camera and light support of maximum flexibility of adjustment, both in respect to angular adjustment, or orientation, and spacing, and makes it possible to obtain by the use of flash guns or strobes photographs comparable in quality to those obtainable by studio lighting, or by the use of banks of independent light units.

It is apparent that many different embodiments of this invention may be made without departing from the spirit and scope thereof and, therefore, it is not intended by this description to limit the invention except as indicated in the appended claims.

Having thus described the invention, what I claim and desire to secure by Letters Patent is:

1. A hand-held camera and flash gun support comprising a support for detachably supporting a camera, a supporting member for detachably supporting a flash gun, a plurality of telescoping members including first and second telescoping tubes and a hexagonal rod, means for clamping said telescoping tubes in adjusted positions, mounting means secured to said camera supporting member and slidably receiving the outer one of said telescoping tubes for adjustment of said mounting means longitudinally of said outer telescoping member, said hexagonal rod having an annular groove adjacent to the outer end thereof, and means for mounting said flash gun support on the outer end of said hexagonal rod, said mounting means comprising a sleeve having an opening herein and closed at its upper end, a clamping screw carried by said sleeve and projecting into the opening in said sleeve, said sleeve being mounted on said rod for longitudinal movement relative thereto to align said screw with said annular groove or selectively with a flat surface of said rod below said groove whereby to position said sleeve for adjustment of said flash gun angularly about the longitudinal axis of the rod or selectively to clamp the flash gun against rotational adjustment relative to the rod.

2. A hand-held camera and flash gun support comprising a first support member for detachably supporting a camera, a second support member for detachably supporting a flash gun, telescoping interconnector means for interconnecting said first support member and said second support member, the latter said means including a plurality of telescoping members, means for releasably securing said telescoping members in positions of longitudinal adjustment relative to each other, and means for preventing rotation of said telescoping members relative to each other as they are extended and retracted, the camera and flash gun support further including clamping and swivel mounting means secured to said first support member, the latter said means comprising a sleeve interlocked with said outer one of said telescoping members to prevent rotation thereof relative to said sleeve and said sleeve slidably receiving the outer one of said telescoping members for said outer one of said telescoping members to be adjusted in longitudinal position, means for clamping said outer one of said telescoping members in position of longitudinal adjustment relative to said sleeve, and connections between said sleeve and said first support member for angular adjustment of said telescoping members as a whole about perpendicularly related axes each of which is perpendicular to the longitudinal axis of the telescoping members, and the camera and flash gun support further including means for mounting said second support member on the inner one of said telescoping members for angular adjustment about the longitudinal axis of the telescoping members and for adjustment about an axis perpendicular to said longitudinal axis.

3. A camera and flash gun support as set forth in claim 2 wherein said clamping and swivel mounting means is characterized by having first and second right angle brackets, one arm of the first bracket being secured to said first support member, the other arm of the first bracket and one arm of the second bracket being angularly adjustably secured to each other, and a third bracket including said sleeve and an arm on said sleeve extending laterally from the sleeve, said arm of said third bracket being angularly adjustably secured to the other arm of the second bracket.

4. A camera and flash gun support as set forth in claim 2, wherein the telescoping members comprise first and second telescoping tubes and a hexagonal rod, there being a hollow guide for the second tube secured to the adjacent end of the first tube and a hollow guide for the hexagonal rod secured to the adjacent end of the second tube for guiding the hexagonal rod.

5. A camera and flash gun support as set forth in claim 2, wherein the telescoping members comprise first and second telescoping tubes and a polygonal rod, there being guide means for the second tube secured to the adjacent end of the first tube, said second tube having a longitudinal slot therein, said guide means including means for slidably engaging said slot to prevent relative rotation of said tubes during their extension and retraction, and there being guide means for the polygonal rod secured to the adjacent end of said second tube, said guide means for the polygonal rod having a polygonal aperture therein conforming to the rod to prevent rotation of the rod relative to the second tube.

6. A camera and flash gun support as set forth in claim 2, wherein the telescoping members comprise a pair of telescoping tubes having external longitudinal slots therein, there being first pin means carried by the outer one of said tubes and engaging the slot in the inner one of said tubes for preventing relative rotation of said tubes and second pin means carried by said sleeve and engaging the slot in the outer one of said tubes for preventing relative rotation of said sleeve and tube.

7. A camera and flash gun support as set forth in claim 6, wherein the telescoping members also include a hexagonal rod telescoping into the inner one of said pair of tubes, there being a guide for the hexagonal rod secured to the outer end of the inner one of said pair of tubes, said guide having a hexagonal opening therein in communication with the bore of said inner one of said pair of tubes and receiving said rod for preventing rotation of said rod relative to the inner one of said pair of tubes on relative longitudinal adjustment thereof.

References Cited by the Examiner
UNITED STATES PATENTS

| 2,551,753 | 5/1951 | McCullough | 95—86 X |
| 2,599,269 | 6/1952 | Markle | 95—86 |
| 2,644,381 | 7/1953 | Mendelsohn | 95—86 X |

JOHN M. HORAN, *Primary Examiner.*